Oct. 6, 1936.   D. E. TRUCKSESS   2,056,306
ALARM SYSTEM
Filed June 7, 1935
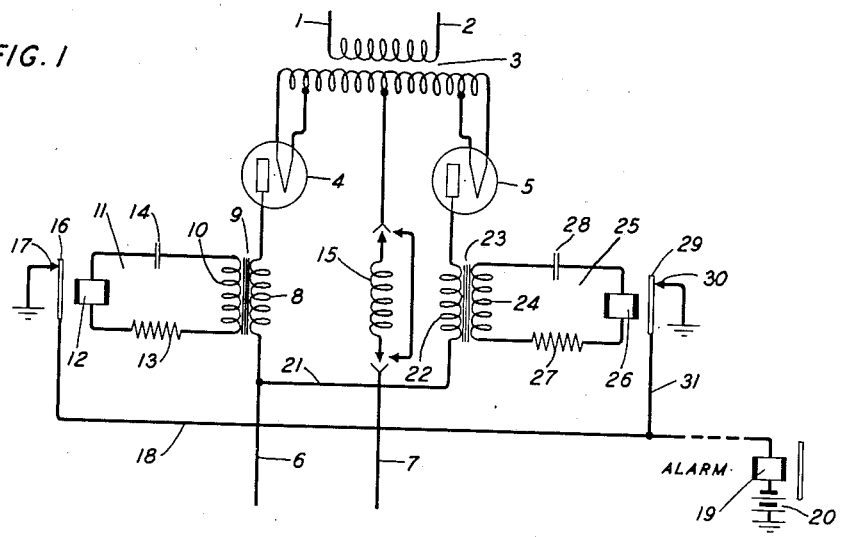
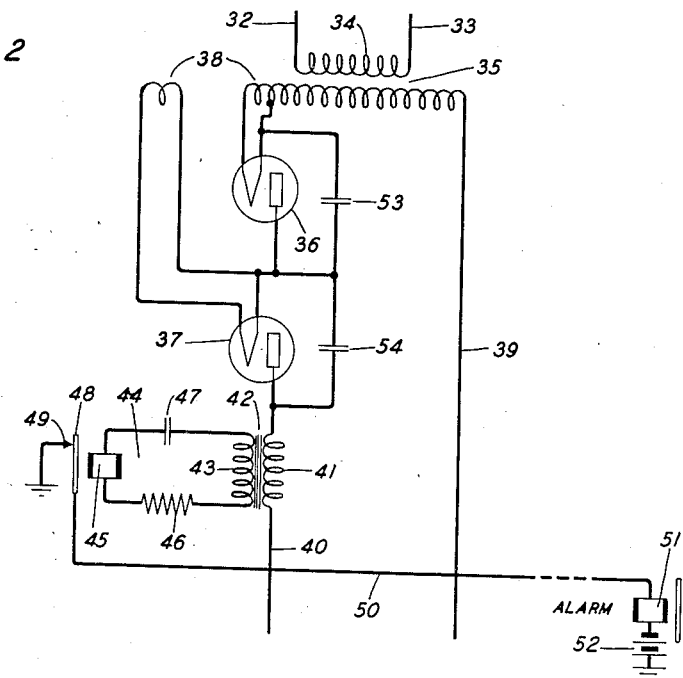
INVENTOR
D. E. TRUCKSESS
BY J. MacDonald
ATTORNEY Patented Oct. 6, 1936

2,056,306

UNITED STATES PATENT OFFICE 2,056,306

ALARM SYSTEM

David E. Trucksess, New York, N. Y., assignor to Bell Telephone Laboratories, Incorporated, New York, N. Y., a corporation of New York Application June 7, 1935, Serial No. 25,431

2 Claims. (Cl. 177—311)

This invention relates to alarm systems and more particularly to alarm systems used in connection with electric current supply systems such as battery charging systems.

The object of this invention is to indicate the failure of a current supply system to supply the required current.

In accordance with this invention, a primary low voltage winding of a transformer is included in the circuit of a direct current supply system and a secondary high voltage winding of the transformer is included in a circuit with a comparatively low current relay. The relay has no direct connection with the current supply system but only an inductive connection therewith through the transformer. The relay is held operated by the high voltage, low current, alternating current supply generated in the secondary winding of the transformer by a pulsating direct current in the primary winding and is released with a failure of the current supply system. The transformer is preferably designed to have in its secondary winding a large leakage reactance and a high resistance characteristic and in its primary winding a small leakage reactance and a low resistance characteristic. The purpose of this chracteristic is to provide a nearly constant alternating current voltage to the relay circuit with a wide range of direct currents in the current supply system. Release of the relay completes the circuit of an alarm system.

In the drawing:

Fig. 1 is a schematic diagram of a current supply system including rectifiers, providing for full wave rectification, an alarm system and an alarm system control circuit inductively coupled to the current supply system; and Fig. 2 is a schematic diagram of a modification of the system shown in Fig. 1.

In systems for charging storage batteries from a source of supply of alternating current, it is necessary to have in the battery charging system rectifying means to change the alternating current received from the source of supply to a unidirectional current suitable for charging the battery. An evacuated bulb containing a filamentary cathode and a plate anode may be used as a rectifier for the purpose above mentioned. Since the rectifier may break down or otherwise fail to function, or the source of current supply may fail or be turned off during a period in which a battery is being charged, it is advantageous to have some alarm means for automatically indicating when the battery on charge is not receiving the required current. The inclusion of the alarm means is particularly desirable where the battery while being charged is included in a signaling system.

Referring to Fig. 1 of the drawing, the conductors 1 and 2 are provided for connection to a source of supply of alternating current (not shown) but which may be a commercial source of alternating current supply. The conductors 1 and 2 are connected to the primary winding of a transformer 3. The cathodes of two rectifier tubes 4 and 5 are connected at suitable points to the secondary winding of the transformer 3. The anodes of the rectifier tubes 4 and 5 are connected to one side of a pair of conductors 6 and 7. The arrangement of the rectifier tubes, as shown, provides for full wave rectification. A battery to be charged may be connected to the pair of conductors 6 and 7. Connected to the conductor 6 and in series with the anode of the rectifier tube 4 is a comparatively low voltage primary winding 8 of a transformer 9. A comparatively high voltage low current secondary winding 10 of the transformer 9 is connected in an alarm system control circuit 11. The alarm system control circuit 11, therefore, has only an inductive connection with the current supply system. The alarm system control circuit 11 includes a comparatively low current relay 12, a resistance 13 and a condenser 14. The other side of the battery charging circuit including the conductor 7 is connected to a mid-point of the secondary winding of the transformer 3 and may include a filter device 15 or be connected directly to the mid-point of the secondary winding of the transformer 3. The primary winding 8 of the transformer 9 should have a comparatively small leakage reactance and a comparatively low resistance characteristic. The secondary winding 10 of the transformer 9 should have a comparatively large leakage reactance and a comparatively high resistance characteristic. If the windings of the transformer 9 have the characteristics above mentioned, the transformer 9 will deliver to the relay 12 comparatively low amperage, high voltage alternating current generated in the secondary winding 10 of the transformer 9 by the pulsating direct current in the primary winding 8. The relay 12, therefore, may be a comparatively low current relay of a type commonly known as a telephone relay. The relay 12 in the alarm system control circuit 11 controls through its armature 16 and a back contact 17, connected to ground, a local alarm system 18 which includes an alarm device 19 and a source of current supply 20.

When the system is in operation with the conductors 1 and 2 connected to a source of alternating current supply and a battery to be charged is connected across the conductors 6 and 7, the relay 12 is normally energized to attract its armature 16 away from back contact 17. If the rectifier tube 4 fails to deliver current to the battery being charged or if the source of alternating current supply fails or is turned off for any reason, the relay 12 will become deenergized and will release its armature 16 to make contact with back contact 17 and complete the circuit to the alarm device 19. The alarm device 19 will then indicate the failure of the battery charging system to supply the required current to the battery being charged.

With the portion just described of the system shown in Fig. 1, only half wave rectification of the current supplied over conductors 1 and 2 would be obtained. To provide for full wave rectification the anode of the rectifier tube 5 is connected by way of conductor 21 to the conductor 6. In series with the anode of the rectifier tube 5 and connected to conductor 21 is the primary winding 22 of a transformer 23. The secondary winding 24 is included in an alarm system control circuit 25. Included in the alarm system control circuit 25 is a comparatively low current relay 26, a resistance 27 and a condenser 28. The primary winding 22 of the transformer 23 should have a comparatively small leakage reactance and a comparatively low resistance characteristic. The secondary winding 24 of the transformer 23 should have a comparatively large leakage reactance and a comparatively high resistance characteristic. If the windings of the transformer 23 have the characteristics above mentioned, the transformer 23 will deliver to the relay 26 comparatively low amperage, high voltage alternating current generated in the secondary winding 24 of the transformer 23 by the pulsating direct current in the primary winding 22. The relay 26, therefore, may be a comparatively low current relay of a type commonly known as a telephone relay. The relay 26 in the alarm system control circuit 25 controls through its armature 29 and a back contact 30, connected to ground, the local alarm system 18 which includes the alarm device 19 and a source of current supply 20.

When the system is in operation the relay 26 is normally energized to attract its armature 29 away from back contact 30. If the rectifier tube 5 fails to deliver current to the battery being charged, or if the source of alternating current supply fails or is turned off for any reason, the relay 26 will become deenergized and will release its armature 29 to make contact with back contact 30 and complete a circuit over conductor 31 to the alarm device 19. The alarm device 19 will then indicate the failure of the battery charging system to supply the required current to the battery being charged.

If the battery being charged is, at the time of charging, included in a signaling system, such for instance as a telephone system, a suitable filter device represented at 15 should be included in the battery charging system or at some other equally effective point in the apparatus to filter out the alternating current ripple and prevent the alternating current ripple from interfering with the telephone signals.

The modification shown in Fig. 2 provides for only half wave rectification. The conductors 32 and 33 lead from a source of alternating current supply, not shown, and are connected to the primary winding 34 of a transformer 35. The cathodes of the rectifier tubes 36 and 37 are connected through suitable taps to one end of the secondary winding 38 of the transformer 35. The other end of the secondary winding 38 is connected to the conductor 39.

The rectifier tubes 36 and 37 are arranged in series for the purpose of obtaining comparatively high voltage delivery and the output of the tube arrangement is connected to a conductor 40. The battery to be charged may be connected to the conductors 39 and 40. Connected in series with the output of the rectifier tube arrangement and to the conductor 40 is a comparatively low voltage primary winding 41 of a transformer 42. A comparatively high voltage low current secondary winding 43 of the transformer 42 is included in an alarm system control circuit 44. The alarm system control circuit 44 includes a relay 45, a resistance 46 and a condenser 47. The primary winding 41 of the transformer 42 should have a comparatively small leakage reactance and a comparatively low resistance characteristic. The secondary winding 43 of the transformer 42 should have a comparatively large leakage reactance and a comparatively high resistance characteristic. The transformer 42 will deliver to the relay 45 comparatively low amperage high voltage alternating current generated in the secondary winding 43 by the pulsating direct current in the primary winding 41. The relay 45, therefore, may be a comparatively low current relay of a type commonly known as a telephone relay. The relay 45 in the alarm system control circuit 44 controls through its armature 48 and a back contact 49, connected to ground, a local alarm system 50 which includes an alarm device 51 and a source of current supply 52. To prevent flashover, in the rectifier tube arrangement, condensers 53 and 54 are connected around the circuits of the rectifier tubes 36 and 37.

When the system is in operation with the conductors 32 and 33 connected to a source of alternating current supply and a battery to be charged is connected across the conductors 39 and 40, the relay 45 is normally energized to attract its armature 48 away from back contact 49. If either of the rectifier tubes 36 and 37 breaks down or fails to function, or if the source of alternating current supply is cut off, the relay 45 will release its armature 48 to make contact with back contact 49 and thus close the alarm circuit 50 to cause operation of the alarm device 51.

What I claim is:

1. In a current rectifying system in combination, a source of alternating current, a rectifier, an alarm system, a control circuit for said alarm system, a low current type relay in said control circuit having contacts in said alarm system, a current step-down transformer inductively coupling said rectifier to said control circuit, a primary winding in said current step-down transformer connected to said rectifier and having a comparatively low leakage reactance and a comparatively low resistance characteristic, and a secondary winding in said current step-down transformer included in said control circuit and having a comparatively large leakage reactance and a comparatively high resistance characteristic, said current step-down transformer receiving from said rectifier comparatively high amperage pulsating direct current and delivering to said control circuit comparatively low amperage alternating current to hold said low current type relay operated.

2. In a battery charging system in combination, a source of alternating current supply, current rectifying means, an inductive coupling between said source of current supply and said current rectifying means, a conductor connected to the output side of said current rectifying means and adapted to be connected to a battery to be charged, an alarm system comprising a local circuit including an alarm device and a source of current supply for the alarm device, a control circuit for said alarm system including a low current type relay having contacts in said alarm system, a transformer coupling the output side of said rectifying means to said control circuit, a primary winding in said transformer in circuit connection with said rectifying means, said primary winding having a comparatively low leakage reactance and a low resistance characteristic, a secondary winding in said transformer included in said control circuit, said secondary winding having a comparatively large leakage reactance and a comparatively high resistance characteristic, said transformer receiving pulsating direct current from said rectifier and delivering alternating current to said control circuit, and said transformer operating to step down the current from said rectifying means to said control circuit to hold said relay operated while battery charging current is being supplied through said battery charging system.

DAVID E. TRUCKSESS.